July 10, 1945. T. L. GATKE 2,380,230
APPARATUS FOR PRODUCING COMPOSITION BRAKE LINING
MATERIAL IN TRANSVERSELY GROOVED STRIP FORM
Filed Nov. 29, 1939 2 Sheets-Sheet 1
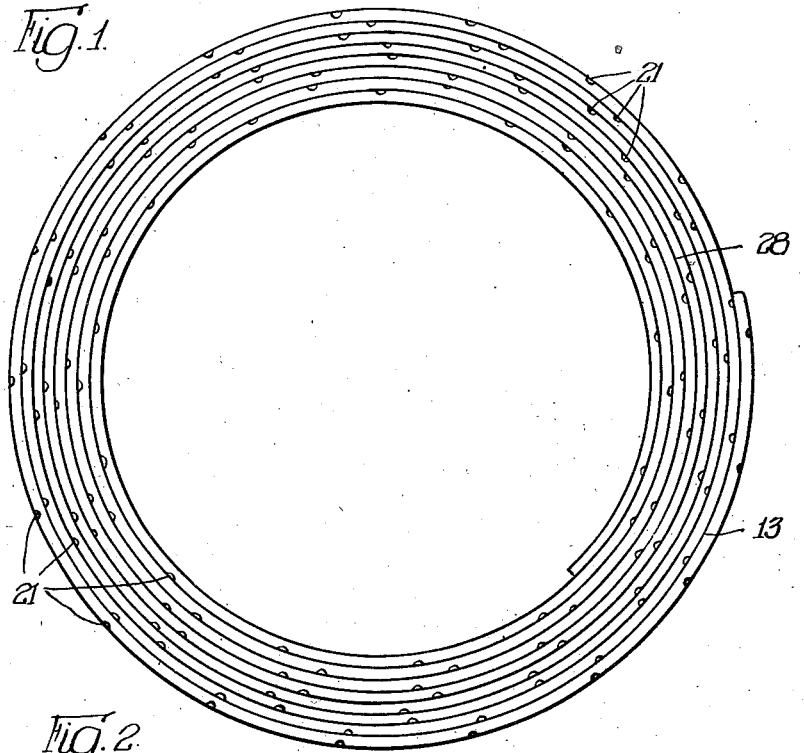
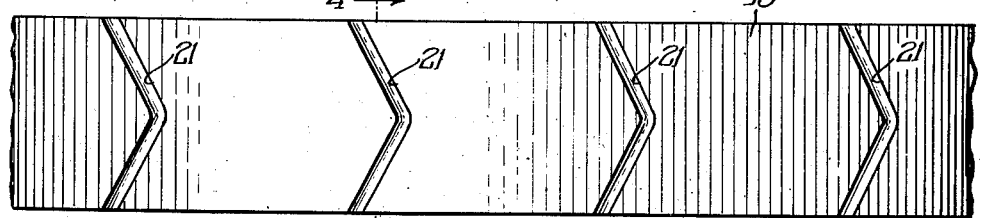
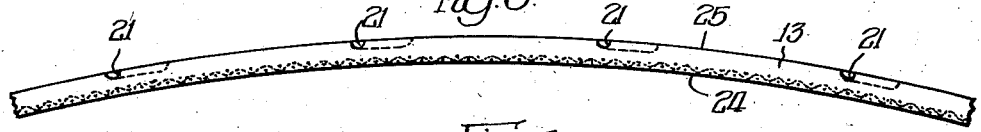
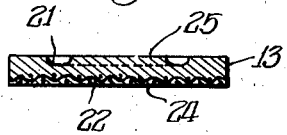
INVENTOR.
Thomas L. Gatke,
BY Cromwell, Greist + Warden
ATTORNEYS.

July 10, 1945.   T. L. GATKE   2,380,230
APPARATUS FOR PRODUCING COMPOSITION BRAKE LINING
MATERIAL IN TRANSVERSELY GROOVED STRIP FORM
Filed Nov. 29, 1939   2 Sheets-Sheet 2
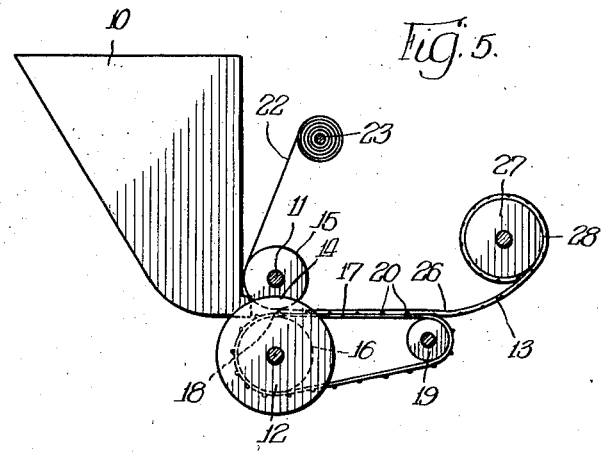
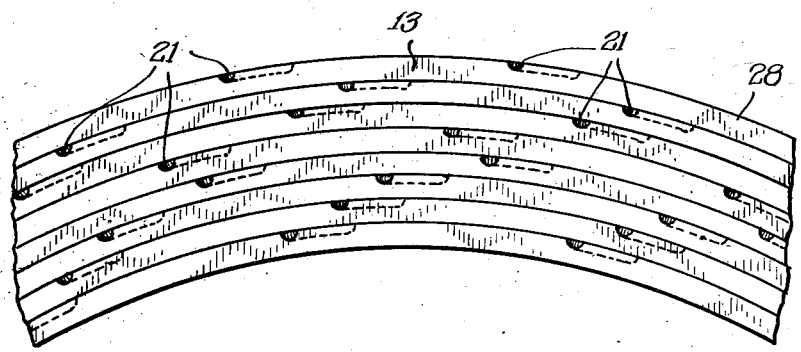
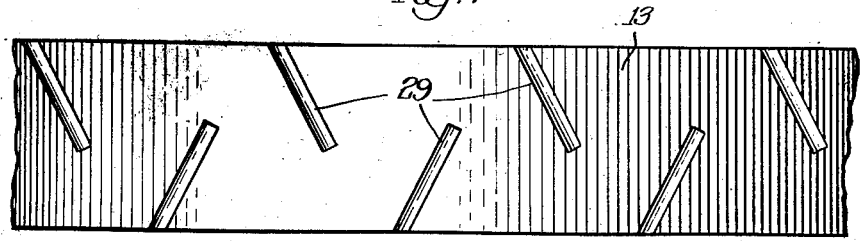
INVENTOR.
Thomas L. Gatke,
BY Cromwell, Greist + Warden
ATTORNEYS.

Patented July 10, 1945

2,380,230

UNITED STATES PATENT OFFICE 2,380,230

APPARATUS FOR PRODUCING COMPOSITION BRAKE LINING MATERIAL IN TRANSVERSELY GROOVED STRIP FORM

Thomas L. Gatke, Oak Park, Ill.

Application Novmber 29, 1939, Serial No. 306,627

5 Claims. (Cl. 18—10)

The purpose of the present invention is to provide a new and useful apparatus for use in producing composition brake lining material in the form of a transversely grooved strip, which strip is somewhat flexible and is adapted to be applied to the curved face of a brake shoe or other member by being bowed into conformity with the curvature of such face.

In brake lining material of the type used on curved brake shoes it is desirable to provide transverse grooves in the friction surface of the material. Such grooves not only tend to trap and carry off foreign matter but aid in evenly wearing in the material, in cooling the same in service, and in preventing surface glazing.

Heretofore transverse grooves of this sort have been successfully employed in brake lining material of the type which is relatively inflexible and is die molded in short lengths at the outset into the particular shape in which it is intended to be used in service. Most brake lining material today, however, is not of this hard rigidly preshaped individual piece type but is relatively flexible and is produced in long coiled up strips, usually many feet in length, from which short pieces of the proper length are cut as needed.

Such strips are ordinarily molded from a plastic fibrous compound which has much the consistency of soft putty until after being cured by the application of heat. After curing, the strips become hard and somewhat resistant to bending.

As flexible strips made of this composition have but very little resistance to torsional stresses and will break easily along any line of abruptly reduced thickness, it has not been considered feasible in the past to provide transverse grooves in the same.

I have discovered that by providing specially arranged grooving in the friction face of such material—which grooving will not act as scoring lines across the width of the material—and by introducing a flexible reinforcement in the opposite face, preferably of wire mesh, all of the advantages of grooving can be obtained without interfering in any way with the material being rolled up into coils and without interfering with pieces cut from such coils being bowed without breakage into conformity with curved brake shoes of varying radii.

I have also discovered an ingenious and highly practical apparatus for producing this kind of grooved composition brake lining material in long coiled up strips, which forms the subject matter of this application.

While the foregoing statements are indicative in a general way of the nature of the invention, other more specific objects and advantages will be apparent to those skilled in the art upon a full understanding of the novelly grooved flexible composition brake lining strip and the new apparatus for producing such strips in coils.

A preferred embodiment of the invention is presented herein for the purpose of exemplification, but it will of course be appreciated that the invention is susceptible of incorporation and practice in other modified forms and ways without departing from the spirit of the invention and scope of the appended claims.

In the accompanying drawings:

Fig. 1 is a side view of a finished coil of the improved brake lining material;

Fig. 2 is a face view of a piece of the coiled strip shown in Fig. 1;

Fig. 3 is an edge view of the piece shown in Fig. 2;

Fig. 4 is a transverse section, taken on the line 4—4 of Fig. 2;

Fig. 5 is a schematic side elevation of the apparatus employed in producing the grooved and coiled composition strip shown in Fig. 1;

Fig. 6 is a side view of a small segment of the coil shown in Fig. 1; and

Fig. 7 is a face view of a piece of the coiled strip, with modified grooving.

The brake lining is preferably made from a composition which has asbestos fibers, synthetic resins, oils and fillers as its principal ingredients. This composition, before being cured by the application of heat thereto, is of dough-like plasticity, is easily molded into any shape, and is just as easily broken or pulled apart, thereby presenting, even without any attempt at grooving at all, a number of practical difficulties to its being progressively molded in strips of such lengths as to require coiling while still soft.

In producing strips from this composition, or from any generally similar composition, with transverse grooves in the friction face thereof, I proceed as follows:

After mixing the composition thoroughly, I feed it from a hopper 10 into a die-like opening present between two rotating rolls 11 and 12, which rolls compress the composition to a small fraction of its original bulk and simultaneously shape it into a strip 13 of the desired cross-section. The roll 12, which is preferably a little larger than the roll 11, is provided with side flanges 14 between which the periphery 15 of the roll 11 is positioned in slightly spaced relation to the periphery 16 of the roll 12. The spacing between the peripheries of the rolls determines the thickness of the molded strip, while the spacing between the side flanges determines the width of the strip.

The periphery 16 of the roll 12 is faced, throughout the portion thereof opposite the roll 11, with an endless band 17 which moves with the roll 12, leaving the same tangentially at 18 and passing about a pulley 19 before returning to the roll 12. This band 17 is provided with a number of small evenly spaced ribs 20 on the surface facing the roll 11, and these ribs imprint grooves 21 into the composition as the latter is compressed and forced to pass between the rolls 11 and 12.

As the composition enters the space between the rolls 11 and 12 from the hopper 10, a web 22 of wire mesh also enters, next to the periphery 15 of the roll 11, unwinding from a spindle 23. The wire mesh becomes embedded in the composition substantially flush with the ungrooved rear face 24 of the strip.

In a strip of say $\frac{3}{16}$" thickness, the wire mesh 22 preferably occupies about a third of the thickness of the strip inwardly from the rear face 24 and the grooves 21 preferably occupy about a third of the thickness of the strip inwardly from the friction face 25, all as illustrated sectionally in Fig. 4.

The periphery of the roll 12 is preferably caused to move at a little greater linear speed than the periphery of the roll 11, this difference in speed having been found to aid in keeping the soft material from coming loose from the wire mesh when leaving the rolls. The periphery of the roll 11 is preferably knurled to provide a fine herringbone design on the rear face of the strip, which design acts to embed the wire mesh slightly in the material.

Upon leaving the rolls 11 and 12, the molded strip 13 travels with the band 17 a short distance, and then, upon reaching a point 26 opposite the pulley 19, leaves the band and is wound up on a rotating mandrel 27, in an open-centered but otherwise solid coil 28.

The special shape of the grooves 21 makes the grooving and coiling of such a plastic composition strip possible. If the grooves were of conventional design, i. e., running straight or diagonally across the strip from one edge to the other, the strip would be ruined before completion, as the soft putty-like condition of the strip would not permit of its being coiled without disintegration at the grooves. By employing in such a plastic strip grooves which extend angularly from the edges of the strip without continuing in straight lines from one edge clear through to the other, as for instance, the V-shaped grooves shown in Fig. 2, I have succeeded in solving this problem. The shape of the grooves 21 presents enough solid material in lateral alignment with the branches of the grooves to effectively resist any pulling apart and breaking down of the plastic mass along those lines.

While wire mesh makes an excellent reinforcing means for the rear face of the grooved strip, it will of course be appreciated that fabric strips or other reinforcing means may be incorporated in place of or in addition to the wire mesh.

After the strip 13, in a length of say twenty-five feet, has been wound up into the coil 28, the latter is removed from the mandrel 27, care being taken not to mash or otherwise deform the coil or any part of the still plastic strip in the same. The coil is then placed in an oven and cured to any desired extent by baking, this curing operation for compositions of the type under consideration being well known in the art.

In the curing operation the windings of the strip in the coil lie against each other, with the grooved friction face 25 of each winding in snug engagement with the ungrooved rear face 24 of the next winding, presenting a solid formation between the innermost and outermost windings except for the openings therethrough resulting from the presence of the grooves 21. These grooves, extending through the otherwise solid body of the coil, facilitate release of the volatiles and also facilitate penetration of the heat into the body, thereby materially aiding in obtaining a uniform cure.

The curing hardens the compound in the strip and gives it considerable strength and resistance to crushing stresses. The cured strip, although readily frangible, is sufficiently flexible to be wound and unwound from the coil, and pieces cut from it can be readily bowed without fracture to conform to brake shoes having various surface curvatures. After the coil has been cured, and before the same is turned over to the user, the strip in the coil is preferably unwound and finished by grinding the friction face.

In Fig. 7 a modification is shown wherein the grooves 29 are straight instead of V-shaped. These grooves 29 are staggered along the strip and are disposed at an angle to the edges thereof. They do not extend clear across the strip but terminate in each instance short of the far edge.

I claim:

1. Apparatus for producing transversely grooved composition brake lining material in long coiled up strips, characterized by a pair of peripherally spaced compressing and shaping rolls between which the composition in soft dough-like form is fed, means for introducing a web of flexible reinforcing material into the composition adjacent the periphery of one of the rolls, means associated with the periphery of the other roll for pressing transverse grooves of substantial depth into the composition, said last named means being so positioned as to press the grooves into one surface of the composition at the same time and place that the web of reinforcing material is introduced into the opposite surface of the composition, a mandrel on which the reinforced and grooved composition strip coming from the rolls is wound upon itself, with the reinforcement on the inside of the strip and the grooves on the outside, and means for rotating the rolls and the mandrel, said reinforced and grooved composition strip being so directed in the apparatus upon leaving the compression and shaping rolls as to avoid any reverse curvature of the strip prior to the latter having the aforesaid curvature imparted to it by the action of the mandrel.

2. Apparatus for producing grooved composition brake lining material in long coiled up strips, characterized by a pair of peripherally spaced compressing and shaping rolls between which the composition in plastic form is fed, a ribbed band extending tangentially from the periphery of one of the rolls for imprinting grooves in the composition, a mandrel on which the grooved composition strip coming from the rolls is wound, with the grooves on the outside of the strip, and means for rotating the rolls and the mandrel.

3. Apparatus for producing transversely grooved composition brake lining material in long coiled up strips, characterized by a pair of peripherally spaced compression and shaping rolls between which the composition in soft dough-like form is fed, a transversely ribbed band extending tangentially from the periphery of one of the rolls to a point of discharge for pressing transverse grooves of substantial depth into the composition, said band moving as a unit with the composition during and following the grooving operation, at a linear speed slightly greater than that of the periphery of the opposed roll, a mandrel at the discharge end of the ribbed band on which the grooved composition strip is wound upon itself, with the grooves on the outside of the strip, and means for rotating the rolls and the mandrel.

4. Apparatus for producing transversely grooved composition brake lining material in strips ready for curing, characterized by a pair of peripherally spaced compression and shaping rolls between which the composition in soft relatively uncompressed dough-like form is fed, means for introducing a web of flexible open mesh wire screening into the composition adjacent the periphery of one of the rolls, the other roll acting on the composition at a point opposite the first roll to compress the composition and force it between the meshes of the reinforcing material, whereby to embed the reinforcing material in the composition adjacent one face of the latter, and means associated with the periphery of said other roll for simultaneously pressing transverse grooves of substantial depth into the other face of the composition, said last named means being so positioned that the composition which is fed between the two rolls is subjected from opposite sides at the same point and at the same time to the aforesaid embedding and grooving operations.

5. Apparatus for producing transversely grooved composition brake lining material in long coiled up strips ready for curing, characterized by a pair of peripherally spaced compression and shaping rolls between which the composition in soft relatively uncompressed dough-like form is fed, means for introducing a web of flexible open mesh wire screening into the composition adjacent the periphery of one of the rolls, the other roll acting on the composition at a point opposite the first roll to compress the composition and force it between the meshes of the reinforcing material, whereby to embed the reinforcing material in the composition adjacent one face of the latter, means associated with the periphery of said other roll for simultaneously pressing transverse grooves of substantial depth into the other face of the composition, said last named means being so positioned that the composition which is fed between the two rolls is subjected from opposite sides at the same point and at the same time to the aforesaid embedding and grooving operations, a mandrel on which the reinforced and grooved composition strip coming from the rolls is wound, with the composition still in a soft condition and with the reinforcement on the inside of the coiled strip and the grooves on the outside, and means for rotating the rolls and the mandrel, said reinforced and grooved composition strip being so directed in the apparatus upon leaving the compression and shaping rolls as to avoid any reverse curvature of the strip prior to the latter having the aforesaid curvature imparted to it by the action of the mandrel.

THOMAS L. GATKE.